(12) United States Patent
Ishimaru

(10) Patent No.: US 11,035,782 B2
(45) Date of Patent: Jun. 15, 2021

(54) OPTICAL CHARACTERISTIC MEASURING DEVICE AND OPTICAL CHARACTERISTIC MEASURING METHOD

(71) Applicant: NATIONAL UNIVERSITY CORPORATION KAGAWA UNIVERSITY, Takamatsu (JP)

(72) Inventor: Ichiro Ishimaru, Takamatsu (JP)

(73) Assignee: NATIONAL UNIVERSITY CORPORATION KAGAWA UNIVERSITY, Takamatsu (JP)

( * ) Notice: Subject to any disclaimer, the term of this patent is extended or adjusted under 35 U.S.C. 154(b) by 149 days.

(21) Appl. No.: 16/326,006

(22) PCT Filed: Aug. 18, 2017

(86) PCT No.: PCT/JP2017/029638
§ 371 (c)(1),
(2) Date: Feb. 15, 2019

(87) PCT Pub. No.: WO2018/034343
PCT Pub. Date: Feb. 22, 2018

(65) Prior Publication Data
US 2020/0284717 A1 Sep. 10, 2020

(30) Foreign Application Priority Data
Aug. 19, 2016 (JP) .............................. JP2016-161493

(51) Int. Cl.
*G01B 9/02* (2006.01)
*G01N 21/27* (2006.01)
*G01N 21/17* (2006.01)

(52) U.S. Cl.
CPC ......... *G01N 21/27* (2013.01); *G01B 9/02091* (2013.01); *G01N 2021/1787* (2013.01); *G01N 2201/062* (2013.01)

(58) Field of Classification Search
CPC ............... G01N 21/27; G01N 21/1702; G01N 2021/1787; G01B 9/02091; G01B 9/0209; G01J 3/42; A61B 5/0095
See application file for complete search history.

(56) References Cited

U.S. PATENT DOCUMENTS

| | | | |
|---|---|---|---|
| 4,886,360 A | 12/1989 | Finlan | |
| 2008/0212100 A1* | 9/2008 | Pavlovsky | G01N 21/1702 356/437 |
| 2011/0154890 A1 | 6/2011 | Holm et al. | |

FOREIGN PATENT DOCUMENTS

| | | |
|---|---|---|
| JP | 2000-199744 A | 7/2000 |
| JP | 2005-287776 A | 10/2005 |

(Continued)

OTHER PUBLICATIONS

Nogo et al. "Thumb-size ultrasonic-assisted spectroscopic imager for in-situ glucose monitoring as optional sensor of conventional dialyzers." Proceedings of SPIE, Mar. 7, 2016, vol. 9699, 96990N, doi: 10.1117/12.2213629.

Nogo et al. "Ultrasonic separation of a suspension for in situ spectroscopic imaging." Optical Review, Feb. 8, 2016, The 5th Asian and Pacific-Rim Symposium, pp. 360-363, doi: 10.1007/s10043-016-0186-x.

(Continued)

*Primary Examiner* — Tarifur R Chowdhury
*Assistant Examiner* — Jonathon Cook
(74) *Attorney, Agent, or Firm* — Oliff PLC

(57) ABSTRACT

A light source, a standing wave forming unit, a detector, and an absorbance calculating unit. The light source irradiates a sample with light. The standing wave forming unit forms, in the sample, an acoustic standing wave perpendicular to a surface of the sample. A node of the acoustic standing wave is positioned at a predetermined distance from the surface of the sample, the light from the light source entering the surface of the sample. The detector detects light emitted from the surface of the sample, and is disposed on the surface of the sample on a side where the light source is (Continued)

disposed. The absorbance calculating unit obtains absorbance.

17 Claims, 9 Drawing Sheets

(56) References Cited

FOREIGN PATENT DOCUMENTS

| JP | 2008-309706 A | 12/2008 |
|---|---|---|
| JP | 2008-309707 A | 12/2008 |
| JP | 2010-276338 A | 12/2010 |
| JP | 2011-187947 A | 9/2011 |
| WO | 2010/040394 A1 | 4/2010 |
| WO | 2016/171042 A1 | 10/2016 |

OTHER PUBLICATIONS

Mori et al. "High sensitivity detection of weak diffuse reflected light from the inside of living tissue by ultrasonic-assisted spectroscopy." The Japan Society for Precision Engineering, Aug. 20, 2016, pp. 37-38, B16.

Yamamoto et al. Proposal of glucose sensor in daily life—Mid-infrared spectroscopic measurement of glucose and albumin. Annual Meeting of The Optical Society of Japan, Oct. 15, 2016, 1aA8.

Nov. 14, 2017 Written Opinion issued in International Patent Application No. PCT/JP2017/029638.

Feb. 19, 2019 International Preliminary Report on Patentability issued in International Patent Application No. PCT/JP2017/029638.

Nov. 14, 2017 International Search Report issued in International Patent Application No. PCT/JP2017/029638.

Jan. 27, 2021 Office Action issued in Chinese Patent Application No. 201780050938.6.

* cited by examiner

OPTICAL CHARACTERISTIC MEASURING DEVICE AND OPTICAL CHARACTERISTIC MEASURING METHOD

TECHNICAL FIELD

The present invention relates to an optical characteristic measuring device and an optical characteristic measuring method that measure an optical characteristic of a sample based on transmitted light while irradiating the sample with light.

BACKGROUND ART

One of methods for identifying a type of a sample or a component included in the sample is a method utilizing optical characteristics such as a refractive index, absorbance, transmittance, and a spectral characteristic (spectrum). In such a method, optical characteristics are measured by a detector detecting a wavelength or intensity of transmitted light while irradiating a sample with light from a light source (Patent Literature 1, 2).

Intensity of transmitted light depends on a distance (an optical path length) through which light from the light source passes an inside of the sample. That is, since the light passing through the sample is absorbed by a component in the sample or scattered by the component, the intensity of the transmitted light becomes weaker as the optical path length is longer. Therefore, to make the intensity of the transmitted light accurately correspond to a concentration of the component in the sample, the optical path length of the transmitted light is necessarily made to be constant.

In a case of a liquid sample, the sample is irradiated with light from the light source in a state where the sample is contained in a sample cell made of a material having light transparency. The sample cell is formed, for example, as a square columnar container having inside a containing space for a liquid sample. Since the dimensions of the containing space is constant, the traveling distance of light, when light from the light source enters from one of opposing side walls of the sample cell and emits from the other side wall, in the containing space, namely, the optical path length, is constant.

Mid-infrared light which is often used for measuring optical characteristics of a biological sample, organic compound or the like has a very high absorbance of water. When the optical path length exceeds 100 $\mu m$, almost entire light is absorbed by a liquid sample. For this reason, when mid-infrared light is to be used to measure an optical characteristic of the liquid sample, a sample cell with a downsized containing space is used. However, in the case of small containing space, when an air bubble is mixed while the liquid sample is poured in the containing space, the air bubble is hard to remove. Further, when the liquid sample has a high viscosity, it is difficult to pour the liquid sample in the containing space. Another problem is that, it is difficult to clean inside a small containing space of a sample cell.

To solve such problems, a built-up sample cell is used in which a ring spacer is placed between two window plates, and they are fastened by a holder. In this sample cell, a liquid sample is contained in the space surrounded by the two window plates and the ring spacer. In this sample cell, the liquid sample is poured within the ring spacer placed on a window plate, and another window plate is put over the ring spacer. The ring spacer and the window plates are then fastened by the holder. Thus, any liquid sample can be contained easily in the space surrounded by the two window plates and the ring spacer without introducing air bubbles in the space. Further, since the window plates and the ring spacer are separated by removing the holder, the sample cell can be easily cleaned.

CITATION LIST

Patent Literature

Patent Literature 1: JP 2008-309706 A
Patent Literature 2: JP 2008-309707 A

SUMMARY OF THE INVENTION

Technical Problem

In the above-described built-up sample cell, light emitted from the light source passes the sample in the space from one of the two window plates toward the other one. Therefore, the distance between the two window plates is the optical path length. In this case, however, the distance between the two window plates slightly changes depending on the fastening state of the holder.

On the other hand, in a case of a solid sample, an optical characteristic of the solid sample is observed by irradiating the sample directly with light from the light source and detecting the light coming out of the sample (transmitted light). In this case, the optical path length of the transmitted light varies with the size of the sample. For this reason, a component included in the solid sample can be identified from the optical characteristic of the light coming out of the sample, but it is difficult to measure an amount of the component.

An objective of the present invention is to make a light passing distance in a sample constant in an optical characteristic measuring device and in an optical characteristic measuring method in which a sample is irradiated with light and the light that has passed through the sample is detected.

Solution to Problem

To solve the above problems, one aspect of the present invention provides an optical characteristic measuring device including:

a light source configured to irradiate a test sample with light;

a standing wave forming unit configured to form an acoustic standing wave in the test sample, the acoustic standing wave being perpendicular to a region where the light from the light source enters on a surface of the test sample, a node of the acoustic standing wave being positioned at a predetermined distance from the region;

a detector configured to detect light coming out of the surface of the test sample, the detector being disposed on a side where the light source is disposed with respect to the region; and an optical characteristic calculator configured to obtain an optical characteristic of the test sample based on a result detected by the detector when the light source irradiates the test sample with the light.

As described later, the device utilizes the phenomenon that an acoustic standing wave formed by the standing wave forming unit generates a high-concentration portion and a low-concentration portion (or dense and sparse portions) in the test sample. Therefore, in any cases where the test sample is a solid sample or a liquid sample, their optical characteristics can be measured. In case of a solid substance, it is classified into a soft substance and a hard substance, and a standing wave can be generated in the soft substance by high-order harmonics generated using the parametric effect. For example, an ultrasonic vibration with the frequency of 1 MHz is applied to a phantom model of skin using agar, which is a soft substance. Supposing that the sonic speed in the phantom model is approximately equal to the sonic speed in water, a standing wave having a frequency of eight-times (=8 MHz) as high as the ultrasonic vibration is formed inside the phantom model due to the high-order harmonics generated by the parametric effect in some cases.

When the test sample is liquid, light from the light source is irradiated to the test sample contained in a container (a liquid cell). When the test sample is solid, the light from the light source is directly irradiated to the solid test sample.

"The acoustic standing wave perpendicular to the surface of the sample" is a standing wave in which the nodes and antinodes align perpendicular to the surface of the sample.

In the optical characteristic measuring device having the above configuration, when the standing wave forming unit forms an acoustic standing wave in the test sample, components in the test sample become dense near nodes due to an acoustic wave pressure and the density near the nodes increases. As a result, the refractive index becomes higher in those portions (hereinafter, node portions) than in other portions (antinode portions). In the acoustic standing wave, a node (a first node from the surface of the test sample) is positioned at a predetermined distance inward from the region where the light from the light source enters (a light incident region). For this reason, a refractive index difference is generated in the test sample between the first node portion and a portion between the first node portion and the light incident region. Accordingly, a virtual reflection surface is formed due to the refractive index difference. Thus, in the state where the acoustic standing wave is formed in the test sample, the light emitted from the light source to the test sample is partially reflected from the surface (the light incident region) of the test sample, and partially enters the test sample from the light incident region. The light that enters the test sample is reflected by the virtual reflection surface, and exits the test sample from the surface. That is, the light coming out of the surface of the test sample includes light reflected by the surface of the test sample and light reflected by the virtual reflection surface. The light reflected by the virtual reflection surface is light that has traveled back and forth in the test sample by a predetermined distance, and pertains to the optical characteristic of the test sample.

In the above configuration, therefore, the optical characteristic calculator obtains an optical characteristic of the test sample based on a result detected by the detector when the standing wave forming unit forms the acoustic standing wave in the test sample. For the detector, those appropriate for an optical characteristic desired to be obtained, such as a light absorption characteristic (light transparency), a spectral characteristic, a polarized light characteristic, are used.

It is preferable that the above configuration further includes a switch that switches between a first state where the acoustic standing wave forming unit forms the acoustic standing wave in the test sample and a second state where the acoustic standing wave forming unit does not form the acoustic standing wave in the test sample. In this case, the optical characteristic calculator obtains an optical characteristic of the test sample based on a result detected by the detector in the first state and a result detected by the detector in the second state.

When an acoustic standing wave is not formed in the test sample, the virtual reflection surface is not formed. In this case, the light coming out of the surface of the test sample when the light source irradiates the test sample with the light is only light reflected from the surface of the test sample. Therefore, by using the result detected by the detector in the state where an acoustic standing wave is formed in the test sample (the first state) and the result detected by the detector in the state where an acoustic standing wave is not formed in the test sample (the second state), the light that has passed through the test sample and has been reflected from the virtual reflection surface, namely, the light pertaining to the optical characteristic of the test sample, can be obtained.

It is preferable that the above configuration further includes an information storage unit that stores a control sample detected result which is the result detected by the detector when the light source irradiates a control sample with the light in a state where the standing wave forming unit forms the acoustic standing wave in the control sample. In this case, the optical characteristic calculator obtains an optical characteristic of the test sample based on the result detected by the detector when the surface of the test sample is irradiated with light in the state where the standing wave forming unit forms the acoustic standing wave in the test sample and the control sample detected result.

In the above configuration, a detected result of the control sample (a control sample detected result) may be obtained in parallel with the test sample, and stored in the information storage unit. Otherwise, a detected result of the control sample may be obtained prior to the detection of the test sample, and stored in the information storage unit.

For example, when the test sample is a composite sample including a known substance and an unknown substance, the known substance is used as the control sample. The "unknown substance" in this case includes the cases: that the substance is unknown, that the content of the substance is unknown, and that both are unknown. For example, in a case where a plasma component or a blood serum component obtained from blood collected from a subject is used as the test sample, standard plasma or standard blood serum on the market may be used as the control sample. When the test sample is a liquid made of solute and solvent, the control sample should be the solvent, and when the test sample is liquid, the control sample may be pure water.

Since the control sample detected result is a result detected by the detector when the surface of the test sample is irradiated with light in the state where the acoustic standing wave is formed in the control sample, a relative optical characteristic of the test sample can be obtained by using the control sample detected result and the detected result of the test sample. For example, when the test sample includes one component or a plurality of components, optical characteristics of the one component or the plurality of components can be measured by using a control sample obtained by eliminating the one component or the plurality of components from the test sample. Further, when the test sample includes one component or a plurality of components, an optical characteristic of one component can be obtained by using a control sample obtained by eliminating the one component from the test sample.

The position of the virtual reflection surface to be formed in the test sample is determined by a wavelength of the acoustic standing wave. Therefore, it is preferable that the optical characteristic measuring device includes a wavelength changing unit that changes a wavelength of the acoustic standing wave formed by the standing wave forming unit.

The acoustic standing wave is formed in the test sample by applying sonic vibration to the test sample, and the wavelength of the acoustic standing wave can be changed by changing a frequency and a cycle of the sonic vibration. Therefore, the standing wave forming unit may include a sonic transducer that applies sonic vibration to the test sample, and a sonic vibration changing unit that changes a frequency and/or a cycle of sonic vibration generated by the sonic transducer.

With the above configuration, the virtual reflection surface can be formed at an appropriate position in accordance with a property of the test sample and a property of light with which the test sample is irradiated. For example, when mid-infrared light, which is greatly absorbed by water, is used as light with which the test sample is irradiated, the wavelength of the acoustic standing wave is made shorter and the distance from the surface of the test sample to the virtual reflection surface is decreased. As a result, the traveling distance (optical path length) of the light that enters the test sample, is reflected by the virtual reflection surface and is go out of the surface of the test sample can be shortened. For this reason, an optical characteristic of a biological component, for example, can be measured in a noninvasive method.

To solve the above problems, another aspect of the present invention provides an optical characteristic measuring method including:

a first step of detecting light coming out of a surface of a test sample when forming, in the test sample, an acoustic standing wave perpendicular to a predetermined region on the surface of the test sample and causing light from a light source to enter the test sample from the predetermined region, a node of the acoustic standing wave being positioned at a predetermined distance from the region;

a second step of detecting light coming out of the surface of the test sample when the light from the light source is caused to enter the test sample from the predetermined region in a state where the acoustic standing wave is not formed in the test sample; and a third step of obtaining an optical characteristic of the test sample based on a result detected in the first step and a result detected in the second step.

Further, a still another aspect of the present invention provides an optical characteristic measuring method including:

a first step of detecting light coming out of a surface of a test sample when forming, in the test sample, an acoustic standing wave perpendicular to a predetermined region of the test sample and causing light from a light source to enter the test sample from the predetermined region of the test sample, a node of the acoustic standing wave being positioned at a predetermined distance from the region;

a second step of detecting light coming out of a surface of a control sample when forming, in the control sample, the acoustic standing wave perpendicular to a predetermined region of the control sample and causing the light from the light source to enter the control sample from the predetermined region of the control sample, a node of the acoustic standing wave being positioned at a predetermined distance from the region: and a third step of obtaining an optical characteristic of the test sample based on a result detected in the first step and a result detected in the second step.

Advantageous Effects of Invention

According to the present invention, an acoustic standing wave, a node of which is positioned at a predetermined distance inward from a surface of a test sample, is formed in the test sample, and a virtual reflection surface is formed in a predetermined position inside the test sample. For this reason, a passing distance through which light is emitted to the test sample from a light source and passes through the test sample to be coming out of a surface of the test sample, namely, an optical path length can be constant. In the present invention, the optical path length of the light to pass through the test sample and to be coming out of the surface of the test sample can be constant regardless of an extent of a containing space in a sample cell to houses the test sample in the case of a liquid test sample and a size of the test sample in the case of a solid test sample.

DESCRIPTION OF EMBODIMENTS

Embodiments of the present invention will be described below with reference to the drawings, but the present invention is not limited to these embodiments.

First Embodiment

[1. Schematic Configuration of Optical Characteristic Measuring Device]

Figure 1:
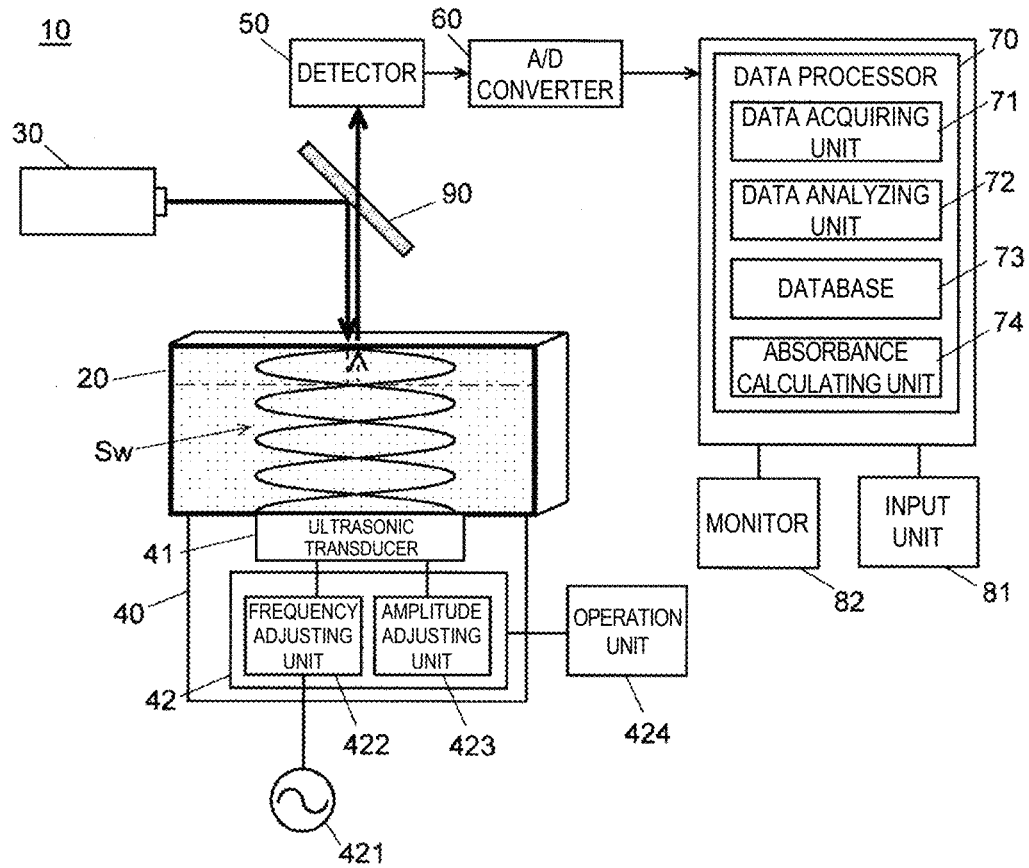
FIG. 1 is a schematic configuration diagram illustrating an optical characteristic measuring device according to a first embodiment of the present invention.

FIG. 1 is a schematic configuration diagram illustrating an optical characteristic measurement device according to a first embodiment of the present invention. An optical characteristic measuring device 10 includes a light source 30, a standing wave forming unit 40, a detector 50, an analog-digital converting unit (ADC) 60, and a data processor 70. The light source 30 irradiates a test sample 20 (hereinafter, simply "sample 20") with light. The detector 50 detects light emitted from a surface of the sample 20, the light from the light source 30 entering the surface. The analog-digital converting unit 60 converts a detection signal from the detector 50 into digital data. The data processor 70 executes a predetermined data process on the detection data which has been subject to the analog-digital conversion. As the detector 50, an optical detector such as a photomultiplier, a photodiode, a charge-coupled device (CCD), or a pyroelectric detector, and a spectrophotometer can be used. Note that in this specification and the drawings including FIG. 1, the sample 20 has a rectangular prism shape, but the shape of the sample 20 is not specific to this.

The light from the light source 30 is reflected from a half mirror 90, and then is emitted to the surface of the sample 20. Further, the light emitted from the surface of the sample 20 passes through the half mirror 90, and then enters the detector 50. In an example illustrated in FIG. 1, the half mirror 90 is used. Alternatively, the sample 20, the light source 30, and the detector 50 may be disposed so that the light from the light source 30 directly enters the surface of the sample 20 and the light emitted from the surface of the sample 20 directly enters the detector 50. In this configuration, the half mirror 90 can be omitted.

The standing wave forming unit 40 includes an ultrasonic transducer 41, and a driving unit 42 that drives the ultrasonic transducer 41. The ultrasonic transducer 41 is mounted to a surface of the sample 20 on an opposite side of the sample 20 from the surface where the light from the light source 30 enters.

The driving unit 42 includes a frequency adjusting unit 422 that adjusts a frequency of alternating-current (AC) power to be output from an alternator 421, and an amplitude adjusting unit 423 that adjusts amplitude of an ultrasonic wave to be generated by the ultrasonic transducer 41. An operation unit 424 that is operated by a user is connected to the standing wave forming unit 40. The driving unit 42 turns on or off the ultrasonic transducer 41 based on an input signal from the operation unit 424, and adjusts amplitude of an ultrasonic wave to be generated by the ultrasonic transducer 41. Therefore, the operation unit 424 and the driving unit 42 function as a switch of the present invention. Further, the frequency adjusting unit 422 and the amplitude adjusting unit 423 function as a wavelength changing unit and a sonic vibration changing unit of the present invention.

When the ultrasonic transducer 41 is mounted to the sample 20 in a state illustrated in FIG. 1, an acoustic standing wave Sw is formed in the sample 20. The acoustic standing wave Sw is perpendicular to a surface to which the ultrasonic transducer 41 is mounted in the sample 20. In the sample 20 illustrated in FIG. 1, since the surface where the ultrasonic transducer 41 is mounted is parallel with a surface where light from the light source 30 enters, the acoustic standing wave Sw is perpendicular also to the surface where the light from the light source 30 enters in the sample 20. Further, the acoustic standing wave Sw can be formed by appropriately adjusting a frequency of an AC power to be supplied to the ultrasonic transducer 41 and amplitude of an ultrasonic wave to be generated from the ultrasonic transducer 41. A node of the acoustic standing wave Sw is positioned at a predetermined distance inward from the surface where the light from the light source 20 enters.

Note that when the sample 20 is solid, the ultrasonic transducer 41 can be mounted directly to the sample 20. On the other hand, when the sample 20 is liquid, the sample 20 is stored in, for example, a rectangular box-shaped sample cell 21 illustrated in FIG. 2, and the ultrasonic transducer 41 is mounted to the sample cell 21. The sample cell 21 can be configured by a rectangular tube shaped container 22 having openings at top and bottom portions, for example, and the window material 24 having light transparency that blocks the opening on the bottom portion. To prevent light from portions other than the light source 30 from entering the container 22, it is preferable that the container 22 is formed by a material having light blocking characteristics. In this configuration, the ultrasonic transducer 41 is mounted to the window material 24. Further, the light from the light source 30 directly enters the sample 20.

Further, the sample cell 21 may include the container 22, and two window materials 23, 24 that blocks the top and bottom openings (see FIG. 5), respectively. In this configuration, the light from the light source 30 passes through the window material 23, and then enters the sample 20. Even in the case where the sample 20 is solid, the ultrasonic transducer 41 may be mounted to the sample 20 via a member corresponding to the above-described window material.

Figure 2:
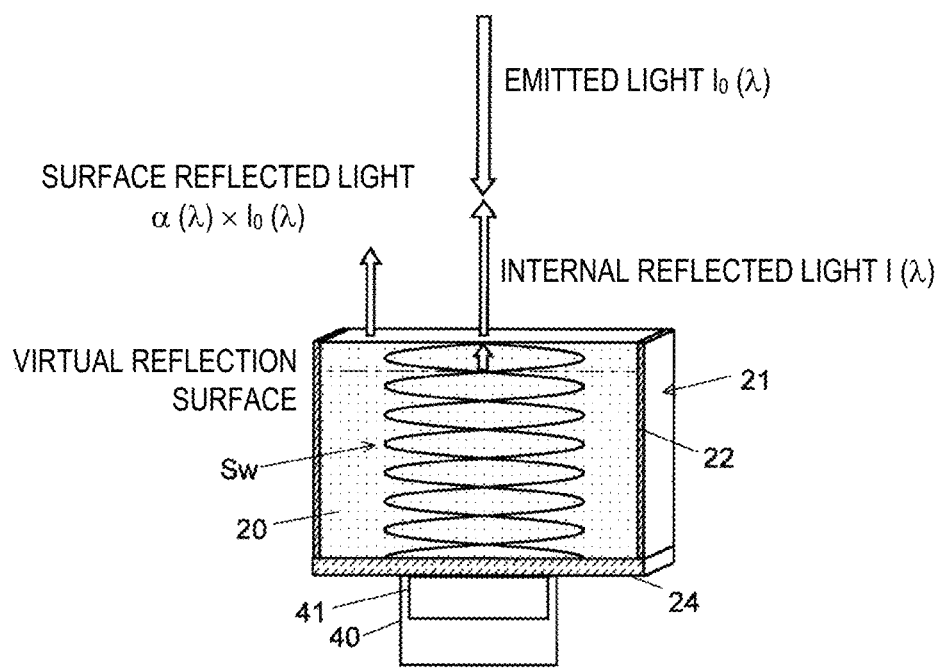
FIG. 2 is a diagram illustrating one example of a sample cell to be used in the optical characteristic measuring device according to the first embodiment, namely, a state where an acoustic standing wave is formed in a sample stored in the sample cell.
Figure 5:
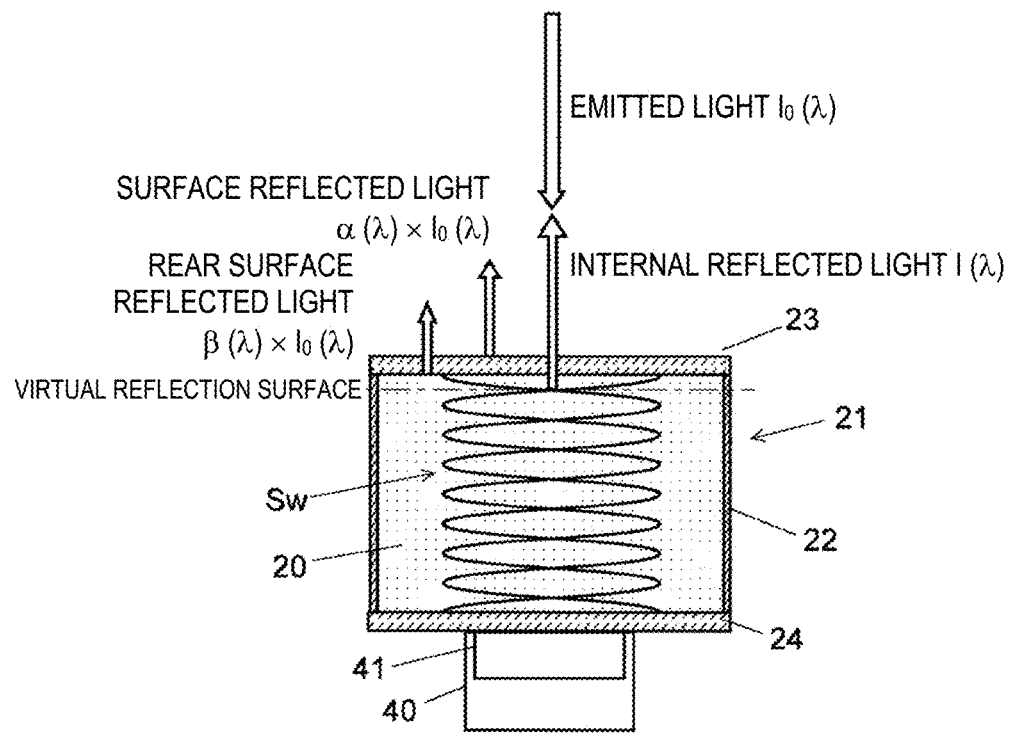
FIG. 5 is a diagram illustrating another example of the sample cell to be used in the optical characteristic measuring device according to the first embodiment, namely, a state where an acoustic standing wave is formed in a sample stored in the sample cell.

Note that FIGS. 1 and 2 illustrate states where the acoustic standing wave Sw having a free end and a fixed end is formed in the sample 20. FIG. 5 illustrates a state where the acoustic standing wave Sw whose ends are free is formed in the sample 20. However, whether the acoustic standing wave Sw having both the free ends or having one free end and one fixed end is formed, namely, whether the end of the acoustic standing wave Sw on the surface where the light from the light source 30 enters (a light incident surface) in the sample 20 is a free end or a fixed end is determined by an acoustic impedance difference on the light incident surface of the sample 20. When the acoustic impedance difference is great, the end is a fixed end, but when small, the end is a free end. For example, when no window material is not provided on the light incident surface and thus the sample 20 contacts with gas (air) on the surface, the acoustic impedance difference with respect to the air is great even though the sample 20 is solid or liquid. For this reason, the end is a fixed end (namely, the acoustic standing wave Sw having a free end and a fixed end is formed). On the other hand, when the sample 20 contacts with the window material 23 on the light incident surface, the end on the light incident surface is a free end or a fixed end depending on quality of the window material 23. Herein, for convenience of the description, when the sample 20 contacts with the window material 23 on the light incident surface, the acoustic standing wave Sw having both free ends is formed. When a wavelength of the acoustic standing wave Sw is defined as $\lambda$, a distance from the light incident surface to a first node is $\lambda/4$ when the end of the acoustic standing wave Sw on the light incident surface is a free end, and is $\lambda/2$ when a fixed end.

The data processor 70 includes a data acquiring unit 71 that acquires detection data which has been subject to analog-digital conversion, a data analyzing unit 72 that analyzes the acquired detection data, a database 73 that is used for analysis in the data analyzing unit 72, and an absorbance calculating unit 74 that calculates absorbance (or transmittance) as an optical characteristic of a sample using detection data to create a light absorption spectrum. In this embodiment, the absorbance calculating unit 74 corresponds to an optical characteristic calculator.

A function of the data processor 70 can be achieved by using dedicated hardware, but is generally achieved by using a general-purpose personal computer as a hardware resource and causing the personal computer to execute dedicated processing software installed in the personal computer. The data processor 70 includes an input unit 81 having a keyboard and a pointing device (a mouse) that are connected to the personal computer to perform various input operations and a monitor 82 that displays measured results.

[2.1 Measuring Principle of Optical Characteristic (1)]

A measuring principle of an optical characteristic using an optical characteristic measuring device of the present invention will be described below with reference to FIGS. 2 to 4.

FIG. 2 illustrates a state where the standing wave forming unit 40 (the ultrasonic transducer 41) forms the acoustic standing wave Sw in the sample 20. FIG. 3 illustrates a state where the standing wave forming unit 40 does not form the acoustic standing wave in the sample 20. FIG. 4 illustrates a state where the standing wave forming unit 40 forms the acoustic standing wave Sw in a control sample 20A. In any states, when the light source 30 irradiates the sample 20 or the control sample 20A with light (emitted light), the emitted light is partially reflected from the surface of the sample 20 or a surface of the control sample 20A (hereinafter, this is referred to as a surface reflected light) and partially enters the sample 20 or the control sample 20A.

When the standing wave forming unit 40 forms the acoustic standing wave Sw in the sample 20, the density of the sample 20 is higher near the node than in the other region due to a node and an antinode of the acoustic standing wave Sw. That is, periodic compression and rarefaction occurs in the sample 20. Since a refractive index of a substance is proportional to density of the substance, the refractive index is higher in a region of the node where the density is high than in the other region. As a result, a refractive index difference is caused between the regions of the node and the antinode of the acoustic standing wave Sw, and a virtual reflection surface (hereinafter, "virtual reflection surface") is formed on a boundary between the node region and the antinode region. For this reason, after the emitted light that enters the sample 20 from the surface of the sample 20 is partially reflected from the virtual reflection surface, the emitted light is emitted from the surface of the sample 20, and partially passes through the virtual reflection surface. In the following description, the light reflected from the virtual reflection surface is referred to as internal reflected light. As described above, when the light source 30 irradiates the sample 20 with the light with the acoustic standing wave Sw being formed in the sample 20, the light to be emitted from the surface of the sample 20 becomes surface reflected light and internal reflected light.

Note that one virtual reflection surface or a plurality of virtual reflection surfaces is formed in the sample 20 based on a length of the sample 20 in a traveling direction of the emitted light and wavelength of the acoustic standing wave Sw. When the plurality of virtual reflection surfaces is formed in the sample 20, the reflected light that has entered the sample 20 and has passed through the first virtual reflection surface from the surface of the sample 20 is partially reflected from the second virtual reflection surface, and a residual part of the reflected light passes through the second virtual reflection surface. Much the same is true on the third and subsequent virtual reflection surfaces. However, since amounts of the light to be reflected from the second and subsequent virtual reflection surfaces are very smaller than an amount of the light to be reflected from the first virtual reflection surface, only the light reflected from the first virtual reflection surface is considered.

The internal reflected light passes through the sample 20 by a distance twice a distance between the surface of the sample 20 and the virtual reflection surface, and then is emitted from the surface of the sample 20. The internal reflected light is obtained after the light that enters the sample 20 is absorbed and scattered by the sample 20, namely is pertaining to the optical characteristic of the sample 20. For this reason, the internal reflected light corresponds to "transmitted light" descried in BACKGROUND ART. The virtual reflection surface is formed in a position of a first node closest to the surface of the sample 20 in the nodes of the acoustic standing wave Sw formed in the sample 20. Positions of the node of the acoustic standing wave Sw are determined by a wavelength of the acoustic standing wave Sw, and the wavelength of the acoustic standing wave Sw is determined by a frequency or a cycle of ultrasonic vibration of the ultrasonic transducer 41. Therefore, by adjusting the frequency or the cycle of the ultrasonic vibration of the ultrasonic transducer 41 to an appropriate value, the position of the virtual reflection surface, namely, an optical path length of the internal reflected light can be adjusted.

Figure 3:
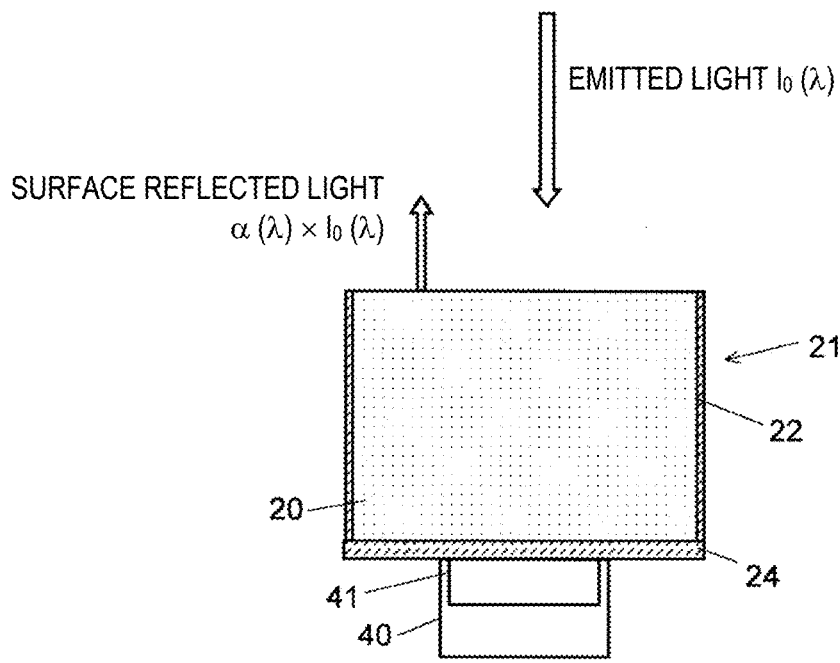
FIG. 3 is a diagram illustrating one example of the sample cell to be used in the optical characteristic measuring device according to the first embodiment, namely, a state where the acoustic standing wave is not formed in the sample stored in the sample cell.

On the other hand, in the state where the acoustic standing wave is not formed in the sample 20, the virtual reflection surface is not formed in the sample 20 (see FIG. 3). For this reason, the emitted light that has entered the sample 20 from the surface of the sample 20 passes through the sample 20 to be absorbed by the sample 20, or is emitted out of the sample cell 21 through the window material 24 mounted to an opposite side of the sample cell 21 from a side where the surface of the sample 20 exists. Alternatively, the emitted light is reflected from the window material 24, and then is absorbed by the sample 20. When the light source 30 irradiates the sample 20 with the light with the acoustic standing wave Sw not being formed in the sample 20, the light to be emitted from the surface of the sample 20 is almost exclusively surface reflected light.

Therefore, in the respective states where the acoustic standing wave Sw is formed or is not formed in the sample 20, the light source 30 irradiates the sample 20 with light and the detector 50 detects the light. Intensity of the internal reflected light, namely, the optical characteristic (the absorbance) of the sample 20 can be obtained from the detected results.

The amount of the light (the emitted light) with which the sample 20 is irradiated by the light source 30 at wavelength $\lambda$ is denoted by $I_0(\lambda)$, and reflectivity of the light reflected from the surface of the sample 20 at wavelength $\lambda$ is denoted by $\alpha(\lambda)$. As a result, an amount of the reflected light from the surface of the sample 20 at each wavelength is obtained as $\alpha(\lambda) \times I_0(\lambda)$. Herein, the reflectivity $\alpha(\lambda)$ is determined by a refractive index of air and a refractive index of the sample 20.

The amount of the light entering the sample 20 is a value obtained by subtracting the light amount of the surface reflected light from the light amount of the emitted light, and the internal incident light amount at wavelength $\lambda$ can be expressed as $(1-\alpha(\lambda)) \times I_0(\lambda)$. Therefore, when the light amount of the internal reflected light at wavelength $\lambda$ is denoted by $I(\lambda)$, absorbance $A(\lambda)$ at wavelength $\lambda$ can be calculated by the following equation.

$$A(\lambda) = -\log_{10}[I(\lambda)/((1-\alpha(\lambda)) \times I_0(\lambda))]$$

When the refractive index of the sample 20 is obtained, the reflectivity $\alpha(\lambda)$ can be theoretically obtained according to a Fresnel reflection law inconsideration of dispersion $n(\lambda)$ that is a difference in refractive index at each wavelength. Further, even when reflectivity $\alpha(\lambda)$ cannot be obtained because the refractive index of the sample 20 is not obtained, the reflectivity $\alpha(\lambda)$ can be experimentally obtained. That is, the light source 30 irradiates the sample 20 with light in the states where the acoustic standing wave Sw is formed and is not formed in the sample 20, and the light emitted from the surface of the sample 20 is detected. From the detected result, spectral absorbance of the sample 20 can be obtained.

When a relative optical characteristic of the sample 20 is obtained or the sample 20 contains one component or a plurality of components (synthetic resin obtained by mixing body issue fluid, blood, and various materials), results detected by the detector 50 in the states where the acoustic standing wave Sw is formed in the sample 20 and in a control sample may be used for obtaining optical characteristics of the components. As the control sample, standard samples as the sample 20 or a sample in which one or a plurality of specific components is eliminated from the sample 20 can be used. Further, when the sample 20 is a liquid sample, pure water may be used as the control sample.

Figure 4:
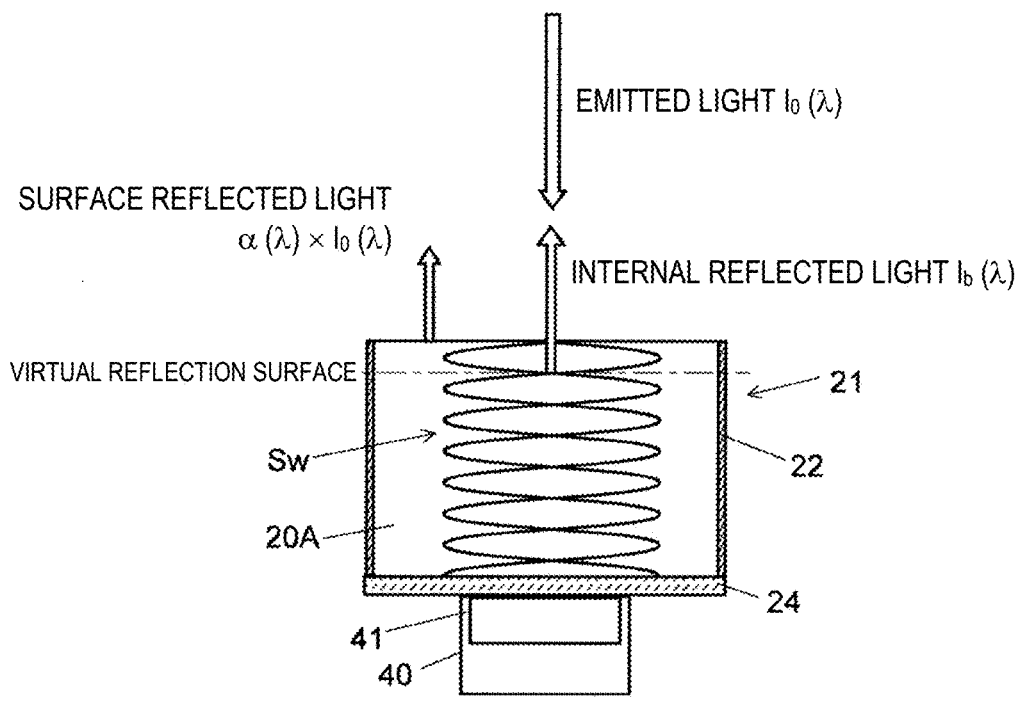
FIG. 4 is a diagram illustrating one example of the sample cell to be used in the optical characteristic measuring device according to the first embodiment, namely, a state where a standing wave is formed in a control sample stored in the sample cell.

Specifically, as illustrated in FIG. 4, the acoustic standing wave Sw is formed in the control sample 20A with the control sample 20A being stored in the sample cell 21. In this state, the light source 30 irradiates the control sample 20A with light. As a result, surface reflected light and internal reflected light are emitted from the surface of the control sample 20A.

When a light amount of emitted light at each wavelength is denoted by $I_0(\lambda)$, a light amount of the surface reflected light to be emitted from the surface of the control sample 20A at each wavelength is approximately equal to a light amount of the surface reflected light of the sample 20. That is, the light amount is expressed as $\alpha(\lambda) n \times I_0(\lambda)$. On the other hand, the light amount $I_b(\lambda)$ of the internal reflected light at each wavelength corresponds to the optical characteristic of the control sample 20A.

Therefore, a relative optical characteristic of the sample 20 or an optical characteristic of a component contained in the sample 20 can be obtained based on the results detected by the detector 50 in the states where the acoustic standing wave Sw is formed in the sample 20 and in the control sample 20A.

[2.2 Measurement Principle of Optical Characteristic (2)]

A measurement principle of an optical characteristic in a case where the light source 30 irradiates the sample 20 with the light through the window material 23 will be described below with reference to FIGS. 5 and 6.

FIG. 5 illustrates a state where the standing wave forming unit 40 forms the acoustic standing wave Sw in the sample 20. FIG. 6 illustrates a state where the standing wave forming unit 40 does not form an acoustic standing wave in the sample 20. In any states, when the light source 30 irradiates the top window material 23 with the light (the emitted light), the emitted light is partially reflected from the surface of the window material 23, and partially enters the window material 23. Further, the emitted light that has entered the window material 23 is partially reflected from a rear surface of the window material 23 (this light is referred to as "rear surface reflected light"), and partially passes through the rear surface of the window material 23 to enter the sample 20 from the surface of the sample 20.

In this example also, when the acoustic standing wave Sw is formed in the sample 20, periodic compression and rarefaction is generated in the sample 20 due to a node and an antinode of the acoustic standing wave Sw. As a result, a refractive index difference is generated between a node region and an antinode region of the acoustic standing wave Sw, and a virtual reflection surface is formed on a boundary between the node region and the antinode region. The emitted light that has passed through the rear surface of the window material 23 to enter the sample 20 is reflected from the virtual reflection surface, and is emitted as internal reflected light from the window material 23. Note that the internal reflected light is partially reflected from the rear surface of the window material 23, but this reflection is ignored here. Thus, when the light source 30 irradiates the sample 20 with light with the acoustic standing wave Sw being formed in the sample 20, the light to be emitted from the surface of the sample 20 is configured by surface reflected light, rear surface reflected light, and internal reflected light.

On the other hand, when the light source 30 irradiates the sample 20 with light with no acoustic standing wave is formed in the sample 20, the light to be emitted from the surface of the window material 23 is configured by surface reflected light and rear surface reflected light.

Therefore, also in this example, intensity of the internal reflected light, namely, an optical characteristic (absorbance) of the sample 20 can be obtained based on results detected by the detector 50 when the light source 30 irradiates the sample 20 with light in the states where the acoustic standing wave Sw is formed and is not formed in the sample 20.

When a light amount of incident light at wavelength λ is denoted by $I_0(\lambda)$, reflectivity on the surface of the window material 23 is denoted by $\alpha(\lambda)$, and reflectivity on the rear surface of the window material 23 is denoted by $\beta(\lambda)$, the amount of the light reflected from the surface of the window material 23 is expressed as $\alpha(\lambda) \times I_0(\lambda)$, and an amount of light reflected from the rear surface is expressed as $\beta(\lambda) \times I_0(\lambda)$. Herein, the reflectivity $\alpha(\lambda)$ is determined by a refractive index of air and a refractive index of the window material 23, and the reflectivity $\beta(\lambda)$ is determined by the refractive index of the window material 23 and a refractive index of the sample 20.

An amount of light to enter the sample 20 is obtained by subtracting the surface reflected light amount and the rear surface reflected light amount of the window material 23 from the emitted light amount, and the internal incident light amount at wavelength λ can be expressed as $(1-\alpha(\lambda)-\beta(\lambda)) \times I_0(\lambda)$. Therefore, when the light amount of the internal reflected light at wavelength λ is denoted by $I(\lambda)$, absorbance $A(\lambda)$ at wavelength λ can be calculated by the following equation.

$$A(\lambda) = -\log_{10}[I(\lambda)/((1-\alpha(\lambda)-\beta(\lambda)) \times I_0(\lambda))]$$

For example, when the window material 23 is made of $SiO_2$, its refractive index is about 1.5. Since the refractive index of air is about 1.0, in a case where the incident light perpendicularly enters the window material 23, reflectivities of a p-polarized light and an s-polarized light are about 4% according to the Fresnel reflection law. Since surface reflectivity in a case of perpendicular incidence is the sum of adding the p-polarized light and the s-polarized light, the surface reflectivity α is about 8%.

Further, in a case where the sample 20 is water, a refractive index of water is 1.33. Therefore, based on the refractive index 1.33 of water and the refractive index 1.5 of the window material 23, reflectivities of the p-polarized light and the s-polarized light on the rear surface of the window material 23 are calculated as about 0.4% according to the Fresnel reflection law. For this reason, average rear surface reflectivity of the window material 23 is about 0.8% that is a total value of the reflectivities of the p-polarized light and the s-polarized light.

In a case of FIG. 5, an adjustment is made so that the node of the acoustic standing wave Sw is present near the rear surface of the window material 23, and this region is higher in density than the other region. That is, since a refractive index of the sample 20 in a region in contact with the rear surface of the window material 23 is larger than a refractive index of the other region, namely, larger than the refractive index 1.33 of water, the rear surface reflectivity β becomes smaller than the above-described value. Therefore, depending on target measurement accuracy, in the state illustrated in FIG. 5 (the state where the acoustic standing wave Sw is formed in the sample 20), the rear surface reflectivity can be ignored as a sufficiently small value.

Further, since a sonic speed in water is about 1500 m/s, when the ultrasonic transducer 41 is vibrated at 20 MHz, the wavelength of the acoustic standing wave Sw to be formed in the sample 20 becomes 0.075 mm that is 75 In FIG. 5, a distance from the surface of the sample 20 to the first node of the acoustic standing wave Sw is 37.5 μm that is half as long as the wavelength of the acoustic standing wave Sw. An optical path length of the internal reflected light that enters the sample 20 from the surface of the sample 20 and is reflected from the virtual reflection surface becomes 75 μm because the internal reflected light reciprocates between the surface of the sample 20 and the virtual reflection surface. Therefore, the optical path length is sufficient for transmission of light in a mid-infrared region. Therefore, the optical characteristic measuring device according to this example can measure an optical characteristic using mid-infrared light.

Second Embodiment

Figure 7:
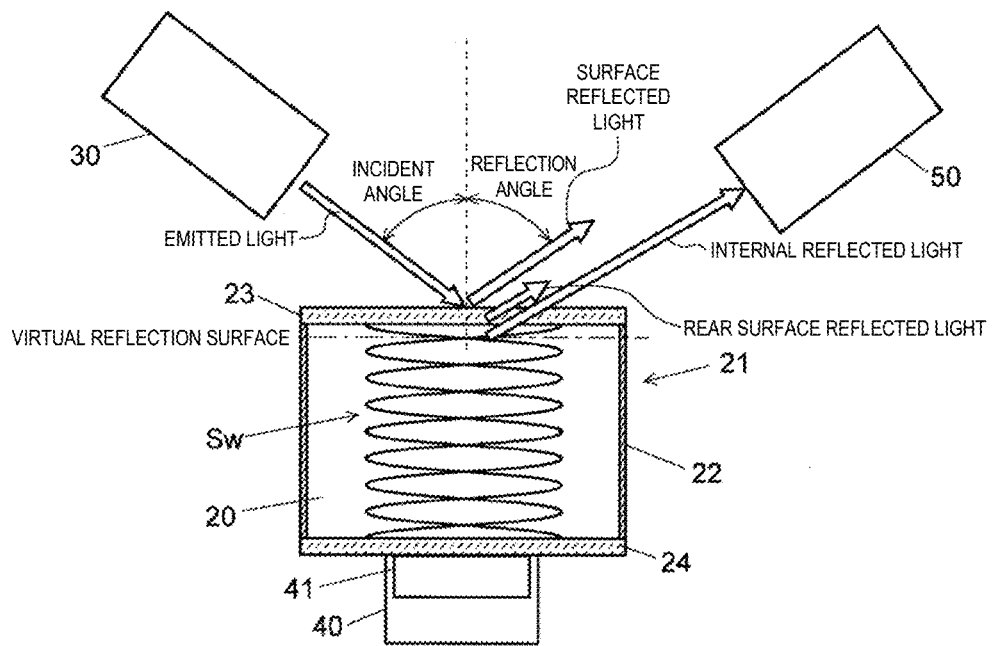
FIG. 7 is a schematic configuration diagram illustrating an optical characteristic measuring device according to a second embodiment of the present invention.

FIG. 7 is a schematic configuration diagram illustrating an optical characteristic measuring device according to a second embodiment of the present invention. In FIG. 7, the optical characteristic measuring device is partially omitted. In this device, a light source 30 is disposed on a position where light from the light source 30 obliquely enters the surface of a sample 20. A detector 50 is disposed in consideration of a situation where an incident angle of the light entering the surface of the sample 20 from the light source 30 is equal to reflection angles of the surface reflected light and the internal reflected light emitted from the surface of the sample 20. In this case, an angle (an incident angle) at which the light from the light source 30 enters the sample 20 is set to a Brewster angle (for example, 58°), and the light to enter the sample 20 is made to be a p-polarized light. As a result, since surface reflectivity $\alpha(\lambda)$ at wavelength λ becomes 0, a surface reflected light amount $(\alpha(\lambda) \times I_0(\lambda))$ of a window material 23 can be optically eliminated.

Figure 6:
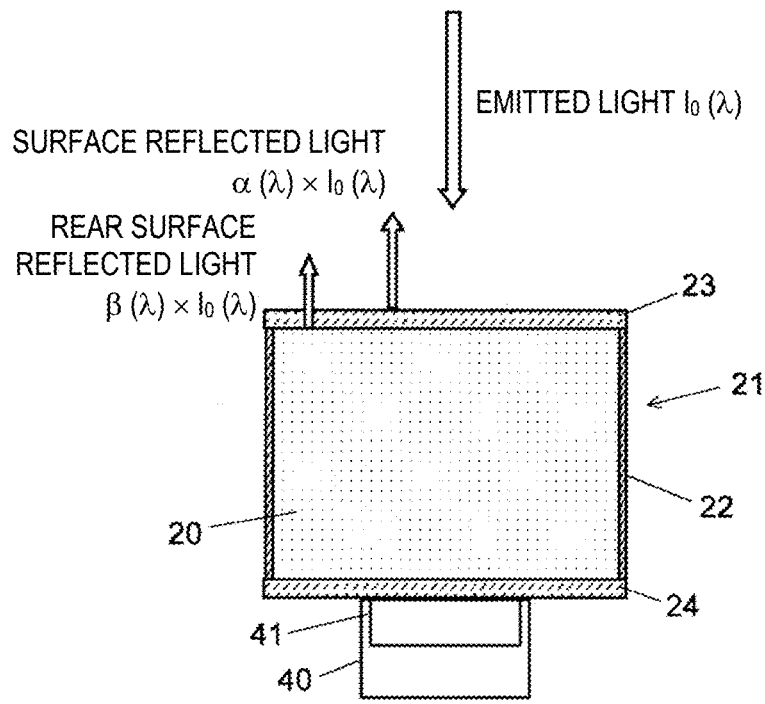
FIG. 6 is a diagram illustrating another example of the sample cell to be used in the optical characteristic measuring device according to the first embodiment, namely, a state where an acoustic standing wave is not formed in a sample stored in the sample cell.

Such a configuration is effective in a case where an internal reflected light amount $I(\lambda)$ is very smaller than the surface reflected light amount $\alpha(\lambda) \times I_0(\lambda)$ of the window material 23 in the configurations illustrated in FIGS. 5 and 6. This is because if the value of the surface reflected light amount $\alpha(\lambda) \times I_0(\lambda)$ falls within a dynamic range of the detector 50, the value of the internal reflected light amount $I(\lambda)$ might be less than detection sensitivity of the detector.

Further, in FIG. 7, an analyzer is provided so that a polarized state of the emitted light from the light source 30 and a polarized state of the light entering the detector 50 establish a cross Nicole relationship. As a result, the rear surface reflected light amount $\beta(\lambda) \times I_0(\lambda)$ of the window material 23 can be also eliminated. In this case, only an s-polarized component of the internal reflected light from which polarization is eliminated is detected as the internal reflected light amount $I(\lambda)$.

Third Embodiment

Figure 8A:
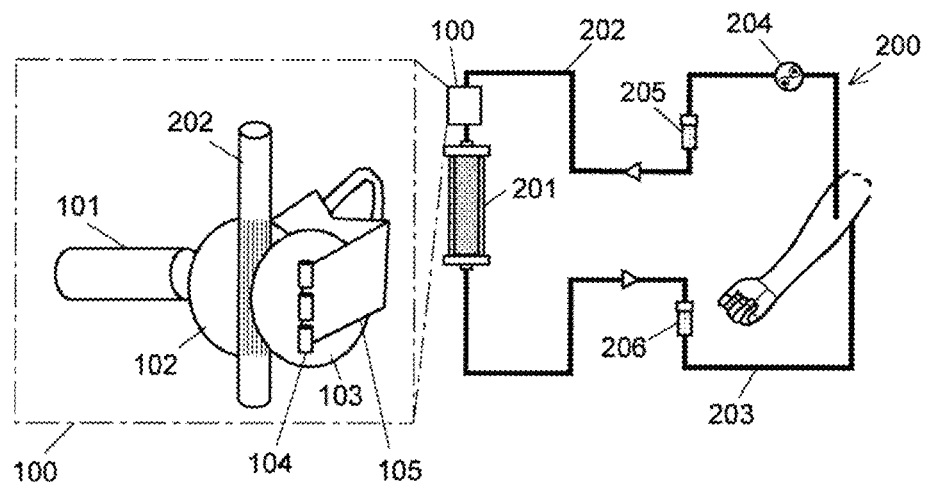
FIG. 8A is a schematic configuration diagram illustrating an example where an optical characteristic measuring device according to a third embodiment of the present invention is incorporated into a hemodialysis device.

FIG. 8A is a schematic configuration diagram illustrating an optical characteristic measuring device according to a third embodiment. In FIG. 8A, the optical characteristic measuring device is partially omitted. Much the same is true on FIGS. 8B and 8C, described later. An optical characteristic measuring device 100 according to this embodiment is incorporated into a hemodialysis device 200 to be used. The hemodialysis device 200 includes a dialyzer 201, a blood collecting tube 202 that collects blood from a patient's blood vessel and feeds the blood to the dialyzer 201, and a blood reinfusion tube 203 that reinfuses blood from which waste is eliminated by the dialyzer 201 to a patient's blood vessel. A pump 204 and an arterial pressure monitor 205 are disposed in the blood collecting tube 202, and a venous pressure monitor 206 is disposed in the blood reinfusion tube 203. Further, not illustrated, a dialysate supply device is connected to the dialyzer 201.

The optical characteristic measuring device 100 according to this embodiment is incorporated into a front portion of the dializer 201 in the blood collecting tube 202. The optical characteristic measuring device 100 includes a device 101 integrally having a light source and a detector, two window materials 102, 103 that hold the blood collecting tube 202, and a standing wave forming unit 105 including an ultrasonic transducer 104 mounted to the window material 103. In the window materials 102, 103, at least the window material 102 is made up of a member having light transparency. Further, in the blood collecting tube 202, at least a portion held between the window materials 102, 103 is made up of a member having light transparency. The window material 103 may be also made up of a member having light transparency, or the blood collecting tube 202 may be entirely made up of a member having light transparency.

Ultrasonic vibration with predetermined frequency and amplitude caused by supplying AC power to the ultrasonic transducer 104 generates an acoustic standing wave in blood flowing in the portion held between the two window materials 102, 103 in the blood collecting tube 202. In this state, the light from the light source included in the device 101 enters the blood collecting tube 202 through the window material 102. The light is then reflected from a virtual reflection surface formed closest to the portion where the light enters in the blood collecting tube 202. The reflected light travels toward the device 101 through a wall surface of the blood collecting tube 202 and the window material 102, and enters the detector installed in the device 101. A detected result of the detector corresponds to an optical characteristic of the blood flowing in the blood collecting tube 202 because the light that has entered the detector has passed through the blood flowing in the blood collecting tube 202. In this example, an optical detector that detects intensity of reflected light or a spectrophotometer that measures a spectral characteristic can be used as the detector.

Figure 8B:
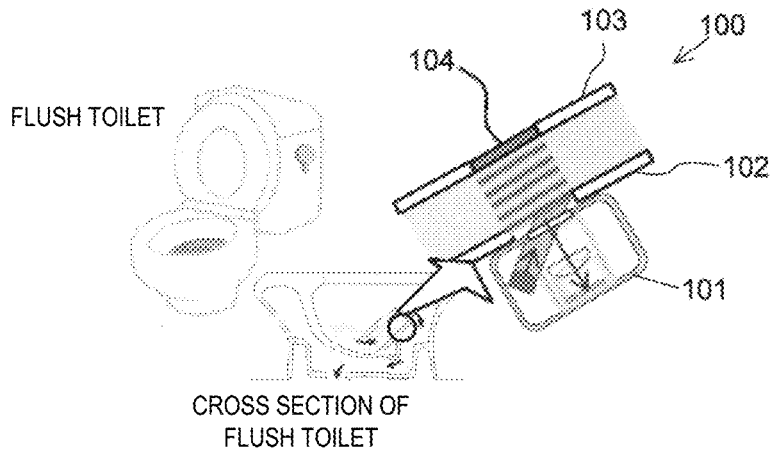
FIG. 8B is a diagram illustrating an example where the optical characteristic measuring device according to the third embodiment is used as a urinary constituent detector to be installed in a toilet bowl in a flush toilet.

FIG. 8B illustrates an example where the optical characteristic measuring device 100 according to this embodiment is used as a urinary constituent detector that is installed in a toilet bowl in a flush toilet to detect an ingredient amount of protein, sugar, and blood (occult blood) in urine. In this example, the optical characteristic measuring device 100 is disposed in a toilet bowl in a flush toilet with the two window materials 102, 103 being space at a predetermined interval and being always soaked in cleaning water. The optical characteristic measuring device 100 drives the ultrasonic transducer 104 and the light source appropriately when a user uses a flush toilet (a sensor detects that the user sits on the toilet bowl of the flush toilet or the user stands in front of the toilet bowl) to form an acoustic standing wave in cleaning water flowing between the window materials 102, 103. The optical characteristic measuring device 100 then causes light (infrared light) from the light source to enter the cleaning water through the window material 103. A spectral characteristic of light reflected from a virtual reflection surface to be formed in the cleaning water varies depending on a type and an amount of a component in urine contained in the cleaning water. Therefore, the detector measures the spectral characteristic of the reflected light and analyzes a result to be capable of obtaining a type and an amount of a component in urine.

Figure 8C:
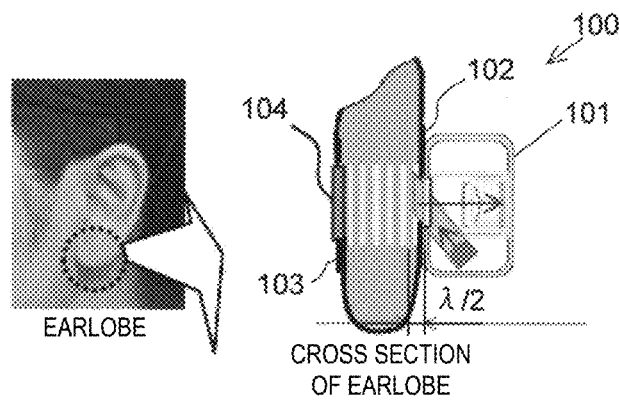
FIG. 8C is a diagram illustrating an example where the optical characteristic measuring device according to the third embodiment is used as a noninvasive blood glucose level sensor.

FIG. 8C illustrates an example where the optical characteristic measuring device 100 according to this embodiment is used as a noninvasive blood glucose level sensor that measures a blood glucose level in the blood flowing in a blood vessel of an earlobe. In this example, the two window materials 102, 103 hold an earlobe. Driving the ultrasonic transducer 104 and the light source forms an acoustic standing wave in the earlobe held between the window materials 102, 103, and causes light (infrared light) from the light source to enter the earlobe through the window material 103. A spectral characteristic of reflected light from a virtual reflection surface varies with an amount of glucose contained in blood flowing in a blood vessel. Therefore, the detector measures the spectral characteristic of the reflected light and analyzes a result so as to be capable of obtaining a blood glucose level.

Fourth Embodiment

Figure 9:
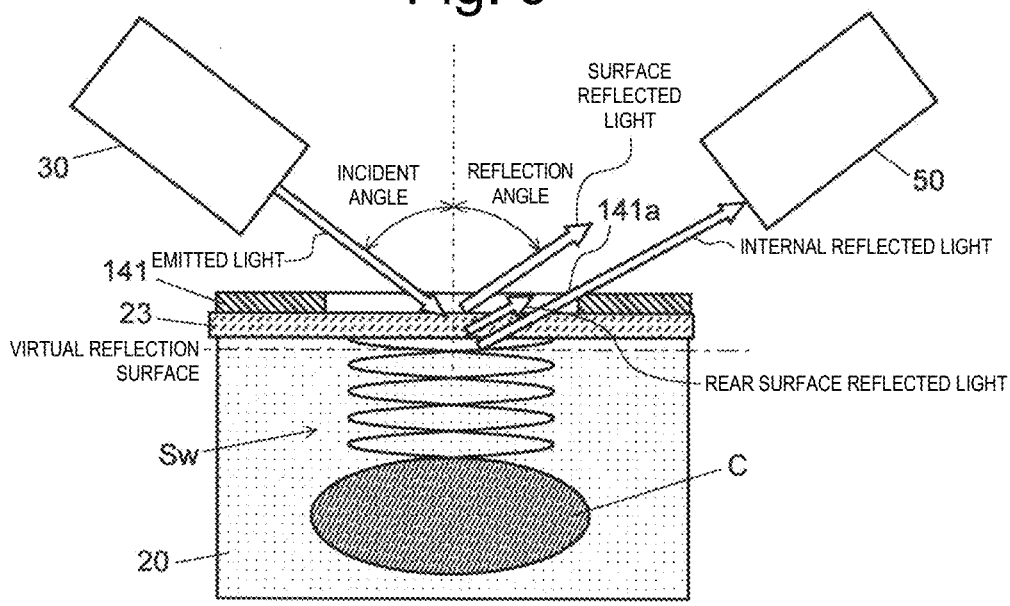
FIG. 9 is a schematic configuration diagram illustrating an optical characteristic measuring device according to a fourth embodiment of the present invention.

FIG. 9 is a schematic configuration diagram illustrating an optical characteristic measuring device according to a fourth embodiment of the present invention. In FIG. 9, the optical characteristic measuring device is partially omitted. Since this device is approximately equal in configuration to the optical characteristic measuring device according to the second embodiment, only different portion will be described, like reference signs are given to like portions, and the description thereof will be omitted.

In this embodiment, a window material 23 is disposed on a surface where light from the light source 30 enters in a sample 20, and a ring-shaped ultrasonic transducer 141 having an opening 141a at its center is disposed on the window material 23. With this configuration, the light from the light source 30 passes through the opening 141a and enters the sample 20 from the window material 23.

In a case where a substance C (bone) that obstructs travel of an ultrasonic wave is present in the sample 20 like a biological sample such as a finger, when an ultrasonic transducer is disposed on a surface opposing the surface where light from the light source 30 enters across the sample 20, the acoustic standing wave Sw is not formed in the sample 20 inside a region where the light from the light source 30 enters. On the contrary, in the above configuration, the ultrasonic transducer 141 disposed on the window material 23 enables the acoustic standing wave Sw to be formed in the sample 20 inside the window material 23. Note that the ring-shaped ultrasonic transducer 141 can be used also in the configuration illustrated in FIGS. 1 and 5.

[Experimental Results]

Specific experimental results using the optical characteristic measuring device of the present invention will be described below.

[1. Measurement of Acrylic Board Using Optical Coherence Tomograph (OCT)]

Figure 10:
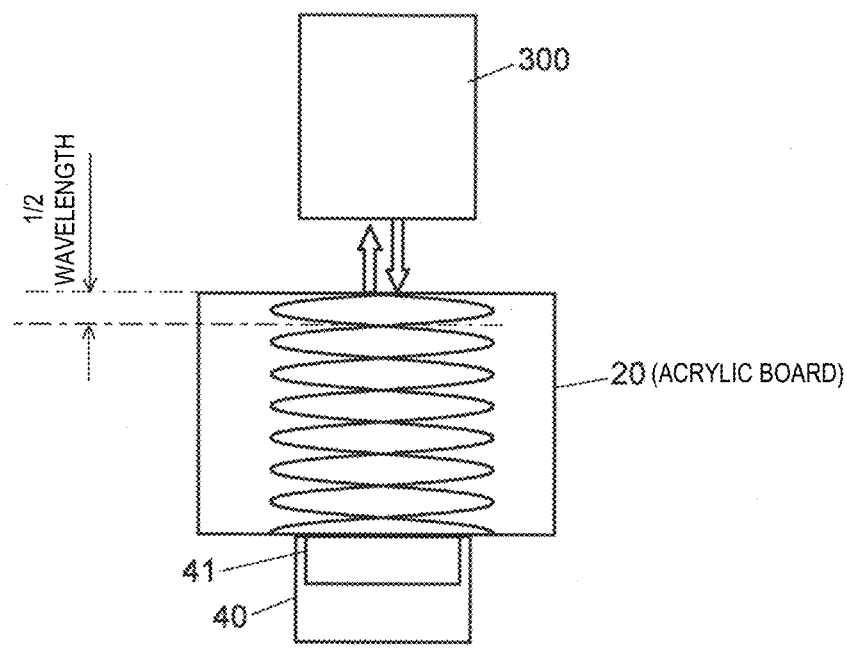
FIG. 10 is a diagram illustrating a device configuration used in an experiment where an optical characteristic of an acrylic board is measured by an optical coherence tomograph (an OCT) as a light source and a detector.

FIG. 10 is a schematic configuration diagram illustrating an optical characteristic measuring device used in this experiment. In this device, an OCT 300 that functions as a light source and a detector was used, the standing wave forming unit 40 (the ultrasonic transducer) was installed below the acrylic board as the sample 20. Further, an upper surface of the acrylic board was irradiated with light from the OCT 300. Since an acoustic impedance difference is great on a surface where light from the light source enters in the case of the acrylic board as the sample 20. The acoustic standing wave Sw to be formed in the sample 20 by the standing wave forming unit 40 has a fixed end on a light incident surface side.

Figure 11:
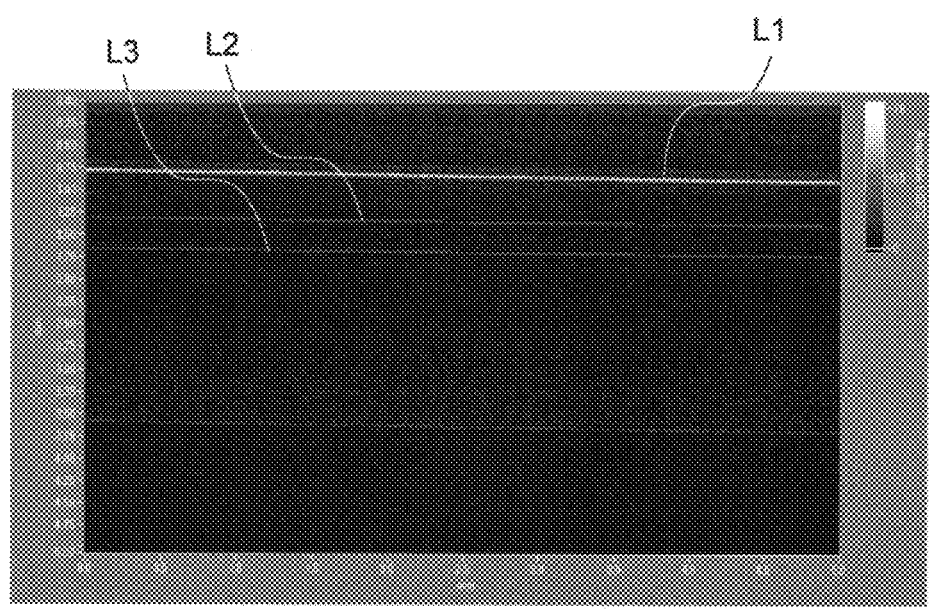
FIG. 11 is an observation image of the OCT in a state where the light source irradiates the acrylic board with light with an acoustic standing wave being formed in the acrylic board.

FIG. 11 illustrates a captured image (an optical coherence tomography image) of the OCT 300 in a state where the ultrasonic transducer was driven by a sinusoidal voltage having frequency of 5 MHz to form an acoustic standing wave in the acrylic board and the light source irradiated the acrylic board with light. As is clear from FIG. 11, three lines were checked in the captured image. A line L1 on the top of the three lines represented the surface of the acrylic board (the light incident surface) that was brightest. The residual two lines L2, L3 were on a position separated by about 0.5 mm from the line L1 and a position separated by about 0.9 mm, respectively.

A wavelength λ of the standing wave to be formed in the acrylic board is obtained by a following equation (1). In the equation (1), a sonic speed (=2730 m/s) is denoted by v, a frequency (=5 MHz) is denoted by f.

$$\lambda = v/f = 2730/(5 \times 10^6) = 5.46 \times 10^{-4}(m) = 0.546(mm) \quad \text{Equation (1):}$$

Since a standing wave having a fixed end on the light incident surface side was formed in the acrylic board, a first node from the light incident surface was in a position separated by λ/2 from the light incident surface. In the captured image through the OCT, since a value is obtained by multiplying an actual length by a refractive index, if a refractive index n of the acrylic board is 1.49, a distance D from the light incident surface to the first node is obtained by the following equation (2).

$$D = (\lambda/2) \times n = (0.546/2) \times 1.49 \approx 0.407(mm) \quad \text{Equation (2):}$$

Depending on some error, the distance D obtained by the equation (2) is regarded to be approximately equal to a distance (0.5 mm) from the line L1 to the line L2. Further, a distance (0.9 mm) from the line L1 to the line L3 is regarded to be twice the distance D. As a result, the lines L2 and L3 were estimated to express light reflection on a virtual reflection surface formed near the first and second nodes from the light incident surface.

Note that in this experiment, only two lines representing the virtual reflection surfaces were observed in the acrylic board, but actually as many virtual reflection surfaces as nodes of an acoustic standing wave are formed in the acrylic board. Only virtual reflection surfaces near the first and second nodes from the light incident surface were observed due to following two reasons.

(1) Reflectivity was high on the first and second virtual reflection surfaces, and an amount of light transmitted to a direction deeper than these virtual reflection surfaces (a lower direction in FIG. 11) was too small. Therefore, a virtual reflection surface was not observed in the other node regions.

(2) The acoustic standing wave formed in the acrylic board was formed by ultrasonic vibration that transmits in a bottom-to-top direction of the acrylic board, and ultrasonic vibration that was reflected from the surface of the acrylic board, namely, a boundary surface between the acrylic board and air and transmitted downward. Therefore, only two lines L2 and L3 were observed because as a pressure difference was greater in a node region near the surface of the acrylic board.

If a virtual reflection surface is formed in the first node region from the light incident surface, an optical characteristic of the sample can be sufficiently measured.

[2. Measurement of Optical Characteristic of Colored Liquid]

The device illustrated in FIG. 7 measured optical characteristics of liquid samples colored with green and red. In this experiment, the ultrasonic transducer was driven by a sinusoidal applied voltage of 8 V having frequency of 2 MHz. Further, a white light-emitting diode (LED) was used as the light source, and a dispersive spectrometer (model: C5966-31, wavelength band: 300 to 800 nm, manufactured by Hamamatsu Photonics K. K.) as the detector.

Figure 12:
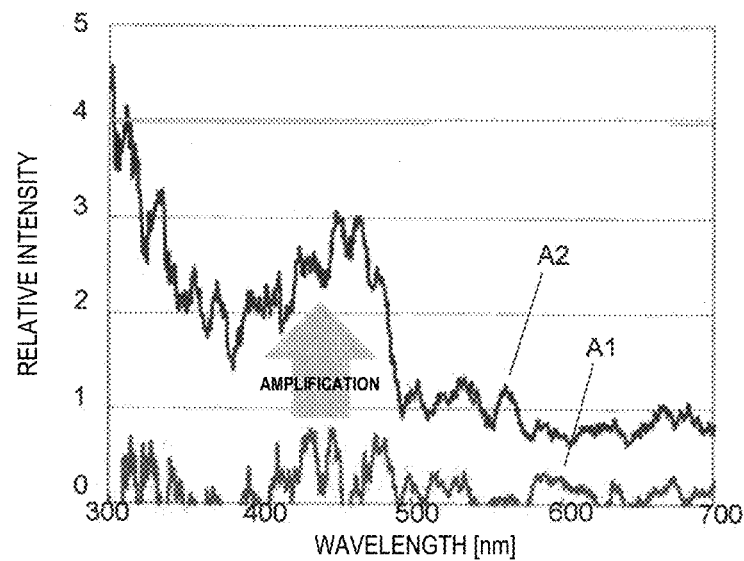
FIG. 12 is a diagram illustrating a result of measuring an optical characteristic of a liquid sample colored with green by using the optical characteristic measuring device illustrated in FIG. 7.

FIG. 12 illustrates a relationship between a wavelength of light emitted from the liquid sample and relative intensity (wavelength spectrum), the relationship being obtained from the detection results from the detector. In this drawing, reference sign A1 indicates a state where an acoustic standing wave was not formed, and reference sign A2 indicates a state where an acoustic standing wave was formed. As is clear from the wavelength spectrum with reference sign A1, in the state where an acoustic standing wave was not formed, the relative intensity did not have great differences due to a wavelength, and internal reflected light pertaining to the optical characteristic of the liquid sample was not emitted. On the other hand, as is clear from the wavelength spectrum indicated by A2, great relative intensity was observed around green wavelength of 450 to 500 nm in the state where the acoustic standing wave Sw was formed. Consequently, internal reflected light pertaining to the optical characteristic of the liquid sample was emitted.

Figure 13:
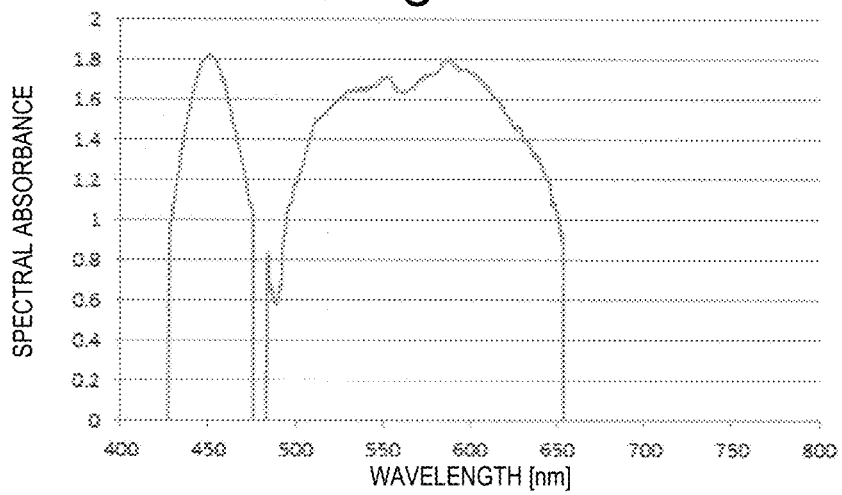
FIG. 13 is a diagram illustrating a result of measuring an optical characteristic of a liquid sample colored with red by using the optical characteristic measuring device illustrated in FIG. 7.

FIG. 13 illustrates spectral absorbance of light emitted from the liquid sample, the spectral absorbance being obtained from the result detected by the detector in the state where the acoustic standing wave Sw was formed in the liquid sample. From this drawing, the light on a side of wavelength shorter than red wavelength of 650 nm was absorbed. Note that the absorbance was high around 450 nm because the white LED was used as the light source.

[3. Measurement of Optical Characteristic of Glucose Solution]

The device illustrated in FIG. 7 measured an optical characteristic of a glucose solution. In this experiment, three types of glucose solutions whose glucose concentrations were adjusted to 100 mg/dL, 500 mg/dL, and 1000 mg/dL were used as test samples, and water was used as a control sample. Further, the ultrasonic transducer was driven by a sinusoidal applied voltage of 40 V having frequency of 10 MHz. A small-sized graphite heater (manufactured by Hawkeye Technologies) was used as the light source. An imaging type two-dimensional Fourier spectrograph (model: MT01-E020, wavelength band: 8 μm to 14 μm, manufactured by Aoi Electronics Co., Ltd.) was used as the detector. A measurement area of this spectrograph was set to 25×25 [μm$^2$].

Figure 14:
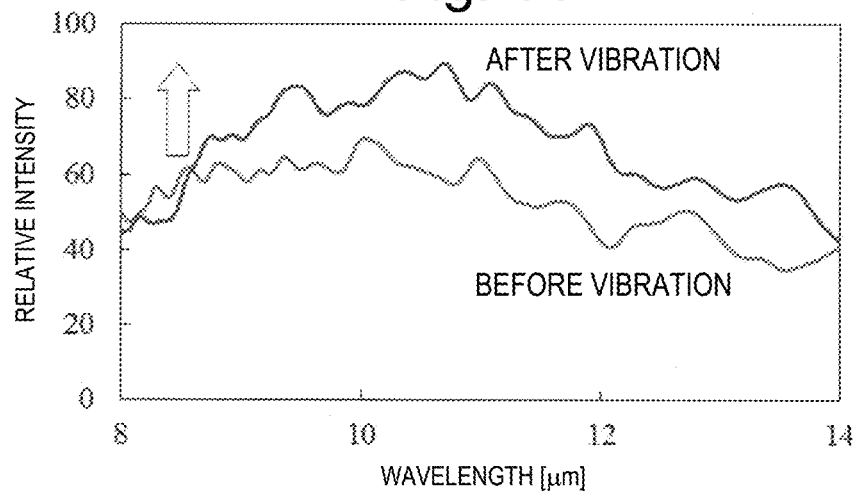
FIG. 14 is a diagram illustrating a result of measuring an optical characteristic of water by using the optical characteristic measuring device illustrated in FIG. 7.

FIG. 14 illustrates a result of measuring water as the control sample (background measurement). As is clear from FIG. 14, a measured result (relative intensity) obtained with vibration being applied by the measuring ultrasonic transducer (after vibration) was larger than a measured result obtained without vibration (before vibration). In other words, in the state where the ultrasonic transducer applied vibration to the control sample, intensity of light obtained by adding reflected light (surface reflected light) on the surface of the control sample and reflected light (internal reflected light) on the virtual reflection surface formed in the control sample was measured. Further, in the state where the ultrasonic transducer did not apply vibration, only intensity of the surface reflected light was measured.

Figure 15:
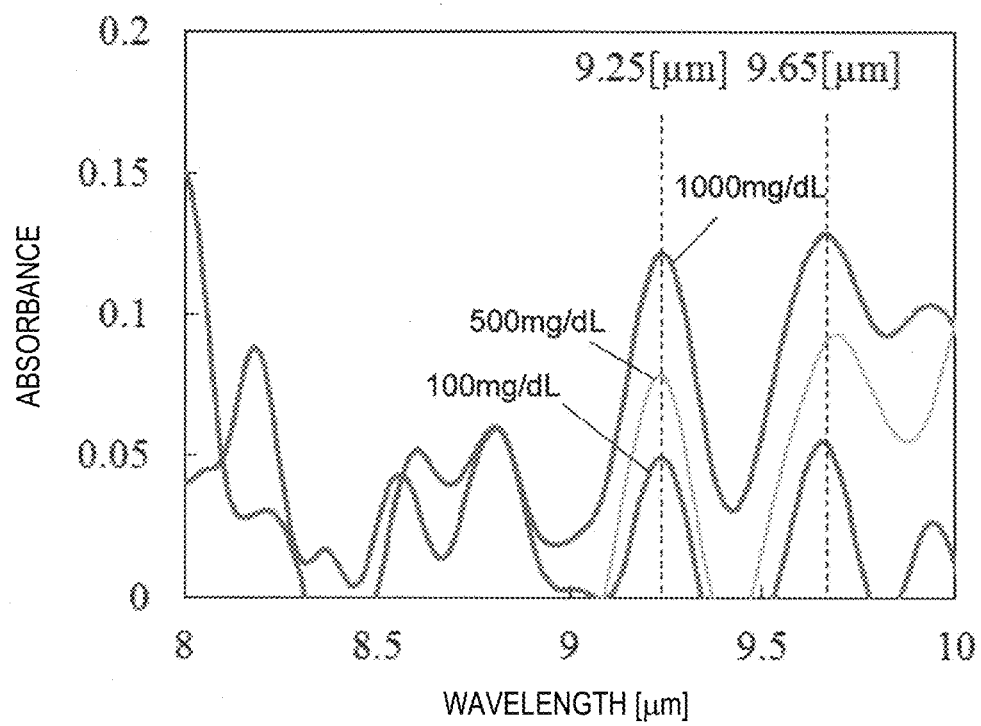
FIG. 15 is a diagram illustrating a result of measuring an optical characteristic of a glucose solution by using the optical characteristic measuring device illustrated in FIG. 7.

FIG. 15 illustrates absorption spectra of three types of test samples having different glucose concentrations. In FIG. 15, an axis of abscissa represents a wavelength, and an axis of ordinates represents absorbance. Absorbance A is calculated by following equations.

$$A = -\log_{10}(B/C)$$

B=relative intensity of the control sample (water) measured with the ultrasonic transducer applying vibration C=relative intensity of the test sample (glucose solution) measured with the ultrasonic transducer applying vibration As is clear from FIG. 15, two absorption peaks (wavelength=9.25 μm, 9.65 μm) of glucose were observed in any test samples.

Figure 16:
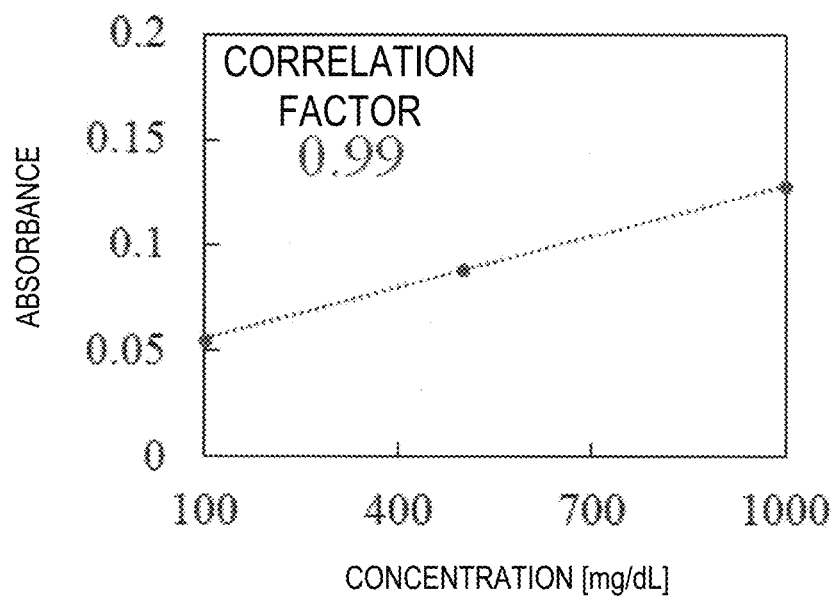
FIG. 16 is a diagram illustrating a relationship between a concentration and absorbance of a high-concentration glucose solution.

FIG. 16 is a graph illustrating a relationship between the absorbance and the glucose concentration at wavelength of 9.65 μm. In the graph of FIG. 16, an axis of abscissa represents the glucose concentration, and an axis of ordinates represents the absorbance. As is clear from this graph, the glucose concentration had a high correlation with the absorbance (correlation factor: 0.99).

Figure 17:
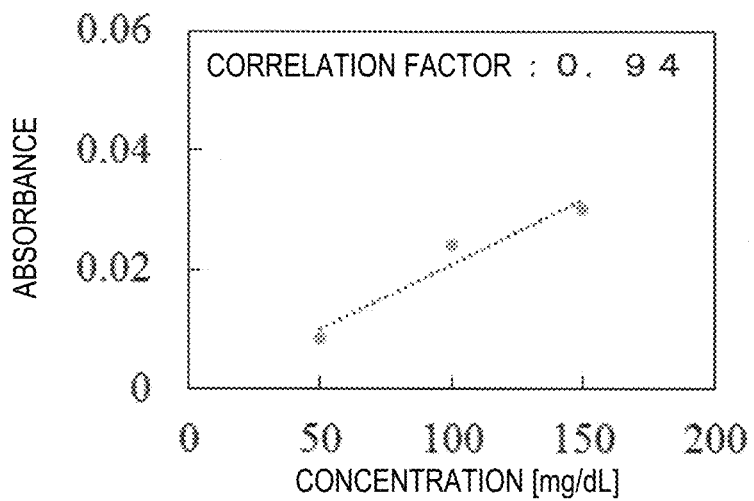
FIG. 17 is a diagram illustrating a relationship between a concentration and absorbance of a low-concentration glucose solution.

Further, FIG. 17 is a graph illustrating a relationship between the absorbance and the glucose concentration at wavelength of 9.23 μm. The relationship was obtained from results of obtaining absorption spectra of low-concentration glucose solutions (50 mg/μL, 100 mg/μL, 150 mg/μL) corresponding to human blood glucose level in the above method. With reference to FIG. 17, although the low-concentration glucose solutions were slightly inferior as compared with a high-concentration glucose solution, but concentration had a high correlation with the absorbance also in the low-concentration glucose solutions (correlation factor: 0.94).

Modified Example

Figure 18:
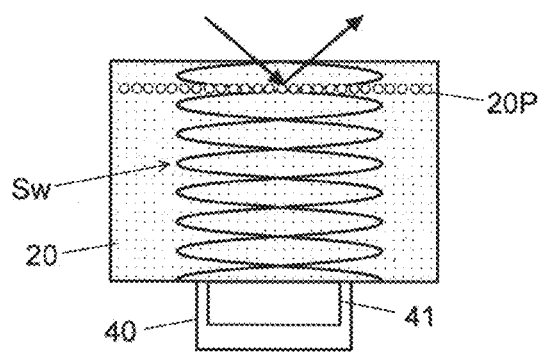
FIG. 18 is a diagram illustrating a state in a liquid sample in a state where an acoustic standing wave is formed in the liquid sample containing particles.

The above embodiments have described the approximately uniform samples, but for example, when the sample 20 is liquid containing particles 20P, the acoustic standing wave Sw is formed in the sample 20 as illustrated in FIG. 18. That is, since the nodes of the acoustic standing wave Sw capture the particles 20P, the particles 20P are disposed on the virtual reflection surface. FIG. 18 illustrates only the particles 20P captured in a place where the virtual reflection surface is formed, but actually the particles 20P are captured at the other nodes. Therefore, when the reflectivity on the virtual reflection surface is low and thus internal reflected light with sufficient intensity cannot be obtained, the reflectivity on virtual reflection surface can be heightened by adding microparticles to the sample 20. An enhancement effect due to a plasmon phenomenon can be expected by adding metal microparticles particularly having free electrons such as gold.

Figure 19:
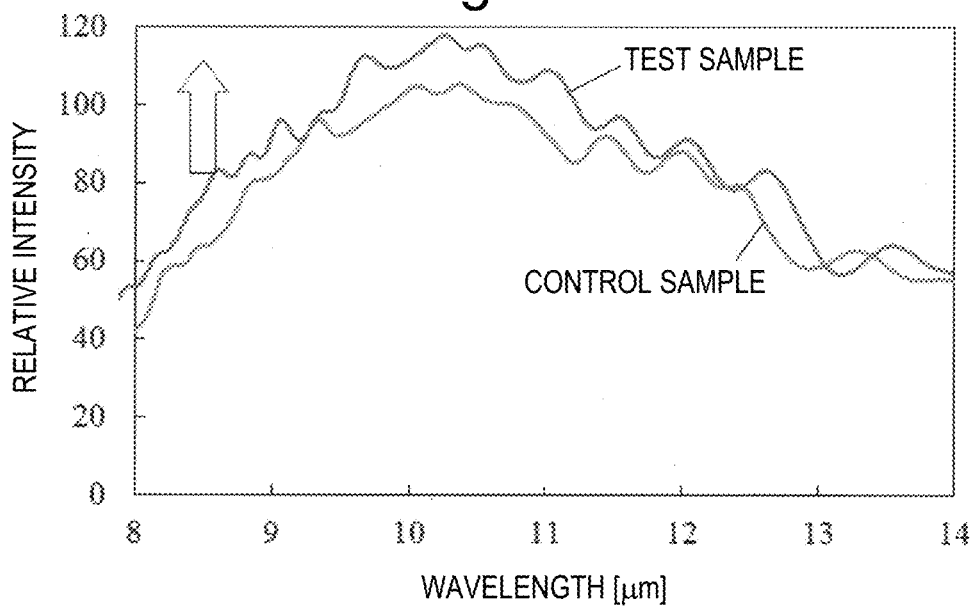
FIG. 19 is a diagram illustrating a result of measuring a test sample including water containing microparticles and a control sample including only water by using the optical characteristic measuring device illustrated in FIG. 7.

Water containing polystyrene microparticles with diameter of 8 μm was used as a test sample, and water that did not contain microparticles was used as a control sample. The device illustrated in FIG. 7 measured optical characteristics of both the samples. The device and a condition used in the measurement were equal to those in the above experiment [3. Measurement of optical characteristic of glucose solution]. FIG. 19 illustrates results of measuring the optical characteristics with the ultrasonic transducer applying vibration to both the test sample and the control sample. In FIG. 19, an axis of abscissa represents a wavelength, and an axis of ordinates represents relative intensity. As is clear from the results illustrated in FIG. 19, the relative intensity of reflection light (surface reflected light+internal reflected light) of the test sample increased by about 6% in comparison with the relative intensity of the control sample.

REFERENCE SIGNS LIST

10, 100 . . . Optical Characteristic Measuring Device
20 . . . Sample (Test Sample)
20A . . . Control Sample
23, 24, 102, 103 . . . Window Material
30 . . . Light Source
40, 105 . . . Standing Wave Forming Unit
41, 104, 141 . . . Ultrasonic Transducer
42 . . . Driving Unit
421 . . . Alternator
422 . . . Frequency Adjusting Unit
423 . . . Amplitude Adjusting Unit
424 . . . Operation Unit
50 . . . Detector
60 . . . Analog-Digital Converter
70 . . . Data Processor
81 . . . Input Unit
82 . . . Monitor
90 . . . Half Mirror
200 . . . Hemodialysis Device
Sw . . . Acoustic Standing Wave

The invention claimed is:

1. An optical characteristic measuring device comprising:
a light source configured to irradiate a test sample with light;
a standing wave forming unit configured to form an acoustic standing wave in the test sample, the acoustic standing wave being perpendicular to a region where the light from the light source enters on a surface of the test sample, a node of the acoustic standing wave being positioned at a predetermined distance from the region, the node increasing a local density of the test sample and creating a virtual reflection surface that reflects a portion of the light;
a detector configured to detect the reflected portion of the light coming out of the surface of the test sample, the detector being disposed on a side where the light source is disposed with respect to the region; and
an optical characteristic calculator configured to obtain an optical characteristic of the test sample based on a result detected by the detector when the light source irradiates the test sample with light.

2. The optical characteristic measuring device according to claim 1, wherein the optical characteristic calculator obtains the optical characteristic of the test sample based on a result detected by the detector when the standing wave forming unit forms the acoustic standing wave in the test sample.

3. The optical characteristic measuring device according to claim 2, further comprising an information storage unit that stores a control sample detected result which is the result detected by the detector when the light source irradiates a control sample with light in a state where the standing wave forming unit forms the acoustic standing wave in the control sample,
wherein the optical characteristic calculator obtains the optical characteristic of the test sample based on the result detected by the detector when the surface of the test sample is irradiated with light in the state where the standing wave forming unit forms the acoustic standing wave in the test sample and the control sample detected result.

4. The optical characteristic measuring device according to claim 3, wherein the test sample is a composite sample including a known substance and an unknown substance, and the control sample is the known substance.

5. The optical characteristic measuring device according to claim 3, wherein the test sample is a liquid sample including a solvent and a dissolved matter, and the control sample is the solvent.

6. The optical characteristic measuring device according to claim 2, wherein the light source is a multi-wavelength light source that emits light in a predetermined wavelength range, and wherein the detector is a spectrophotometer that measures intensity of light at each wavelength.

7. The optical characteristic measuring device according to claim 2, wherein the detector is an optical coherence tomograph.

8. The optical characteristic measuring device according to claim 1, further comprising a switch that switches between a first state where the standing wave forming unit forms the acoustic standing wave in the test sample and a second state where the acoustic standing wave forming unit does not form the acoustic standing wave in the test sample, wherein the optical characteristic calculator obtains the optical characteristic of the test sample based on a result detected by the detector in the first state and a result detected by the detector in the second state.

9. The optical characteristic measuring device according to claim 1, further comprising an information storage unit that stores a control sample detected result which is the result detected by the detector when the light source irradiates a control sample with light in a state where the standing wave forming unit forms the acoustic standing wave in the control sample, wherein the optical characteristic calculator obtains the optical characteristic of the test sample based on the result detected by the detector when the surface of the test sample is irradiated with light in the state where the standing wave forming unit forms the acoustic standing wave in the test sample and the control sample detected result.

10. The optical characteristic measuring device according to claim 9, wherein the test sample is a composite sample including a known substance and an unknown substance, and the control sample is the known substance.

11. The optical characteristic measuring device according to claim 9, wherein the test sample is a liquid sample including a solvent and a dissolved matter, and the control sample is the solvent.

12. The optical characteristic measuring device according to claim 1, further comprising a wavelength changing unit that changes a wavelength of the acoustic standing wave formed by the standing wave forming unit.

13. The optical characteristic measuring device according to claim 1, wherein the standing wave forming unit includes a sonic transducer and a sonic vibration changing unit that changes a frequency and/or amplitude of sonic vibration generated by the sonic transducer.

14. The optical characteristic measuring device according to claim 1, wherein the light source is a multi-wavelength light source that emits light in a predetermined wavelength range, and wherein the detector is a spectrophotometer that measures intensity of light at each wavelength.

15. The optical characteristic measuring device according to claim 1, wherein the detector is an optical coherence tomograph.

16. An optical characteristic measuring method comprising:

a first step of detecting light coming out of a surface of a test sample when forming, in the test sample, an acoustic standing wave perpendicular to a predetermined region on the surface of the test sample and causing light from a light source to enter the test sample from the predetermined region, a node of the acoustic standing wave being positioned at a predetermined distance from the region;

a second step of detecting light coming out of the surface of the test sample when the light from the light source is caused to enter the test sample from the predetermined region in a state where the acoustic standing wave is not formed in the test sample; and a third step of obtaining an optical characteristic of the test sample based on a result detected in the first step and a result detected in the second step.

17. An optical characteristic measuring method comprising:

a first step of detecting light coming out of a surface of a test sample when forming, in the test sample, an acoustic standing wave perpendicular to a predetermined region of the test sample and causing light from a light source to enter the test sample from the predetermined region of the test sample, a node of the acoustic standing wave being positioned at a predetermined distance from the region;

a second step of detecting light coming out of a surface of a control sample when forming, in the control sample, an acoustic standing wave perpendicular to a predetermined region of the control sample and causing light from the light source to enter the control sample from the predetermined region of the control sample, a node of the acoustic standing wave being positioned at a predetermined distance from the region; and a third step of an optical characteristic of the test sample based on a result detected in the first step and a result detected in the second step.

* * * * *